United States Patent
Prasad

(10) Patent No.: US 8,750,842 B1
(45) Date of Patent: Jun. 10, 2014

(54) SYSTEM, METHOD, AND COMPUTER PROGRAM FOR FILTERING A REQUEST TO COMMUNICATE WITH A USER

(75) Inventor: Anunay Kumar Prasad, Pune (IN)

(73) Assignee: Amdocs Software Systems Limited, Dublin (IE)

(*) Notice: Subject to any disclaimer, the term of this patent is extended or adjusted under 35 U.S.C. 154(b) by 110 days.

(21) Appl. No.: 13/410,235

(22) Filed: Mar. 1, 2012

(51) Int. Cl.
H04M 3/42 (2006.01)

(52) U.S. Cl.
USPC ........................... 455/414.1; 455/415

(58) Field of Classification Search
USPC ............................. 455/414.1, 415
See application file for complete search history.

(56) References Cited

U.S. PATENT DOCUMENTS

| | | | |
|---|---|---|---|
| 6,198,812 | B1 | 3/2001 | Weber |
| 6,757,360 | B1 | 6/2004 | Tolopka |
| 7,627,308 | B2 | 12/2009 | Chang et al. |
| 7,877,084 | B2 | 1/2011 | Martin et al. |
| 7,895,154 | B2 | 2/2011 | Newman et al. |
| 2004/0096046 | A1 | 5/2004 | Lection et al. |
| 2008/0146200 | A1* | 6/2008 | Martin et al. ............... 455/413 |
| 2009/0086953 | A1 | 4/2009 | Vendrow |
| 2011/0319061 | A1* | 12/2011 | Schmackpfeffer et al. ... 455/415 |
| 2012/0322429 | A1* | 12/2012 | Chien ....................... 455/414.1 |

OTHER PUBLICATIONS

Stein, R., "2 hidden ways to get more from your Gmail address," Mar. 5, 2008, retrieved from http://web.archive.org/web/20110719073426/http://gmailblog.blogspot.com/2008/03/2-hidden-ways-to-get-more-from-your.html.
Airtel, "Airtel Call Manager," Jul. 28, 2010, retrieved from http://web.archive.org/web/20100728121935/http://www.airtel.in/wps/wcm/connect/Airtel.in/airtel.in/home/whats+new/airtel-call-manager.

* cited by examiner

*Primary Examiner* — Chuong A Ngo
(74) *Attorney, Agent, or Firm* — Zilka-Kotab, PC

(57) ABSTRACT

A system, method, and computer program product are provided for filtering a request to communicate with a user. In use, a request to communicate with a user is received. Additionally, one or more identifiers associated with the request are determined. Further, one or more rules associated with the one or more identifiers are identified. Further still, the request is filtered, according to the one or more rules. Additionally all filtering can be selectively applied over plurality of logical user identities supported over single physical equipment.

17 Claims, 5 Drawing Sheets

SYSTEM, METHOD, AND COMPUTER PROGRAM FOR FILTERING A REQUEST TO COMMUNICATE WITH A USER

FIELD OF THE INVENTION

The present invention relates to telecommunications services, and more particularly to handling various telecommunications.

BACKGROUND

Telecommunications services are currently used on a daily basis. For example, users may communicate utilizing telecommunications by calling other users, text messaging other users, sending multimedia messages to other users, etc. Unfortunately, conventional methods for implementing telecommunications services have exhibited various limitations.

For example, telemarketers and other entities may send unsolicited telephone calls, text messages, multimedia messages, etc. to recipients without their permission, which may result in lost privacy, user upset, and wasted time. There is thus a need for addressing these and/or other issues associated with the prior art.

SUMMARY

A system, method, and computer program product are provided for filtering a request to communicate with a user. In use, a request to communicate with a user is received. Additionally, one or more identifiers associated with the request are determined. Further, one or more rules associated with the one or more identifiers are identified. Further still, the request is filtered, according to the one or more rules.

DETAILED DESCRIPTION

Figure 1:
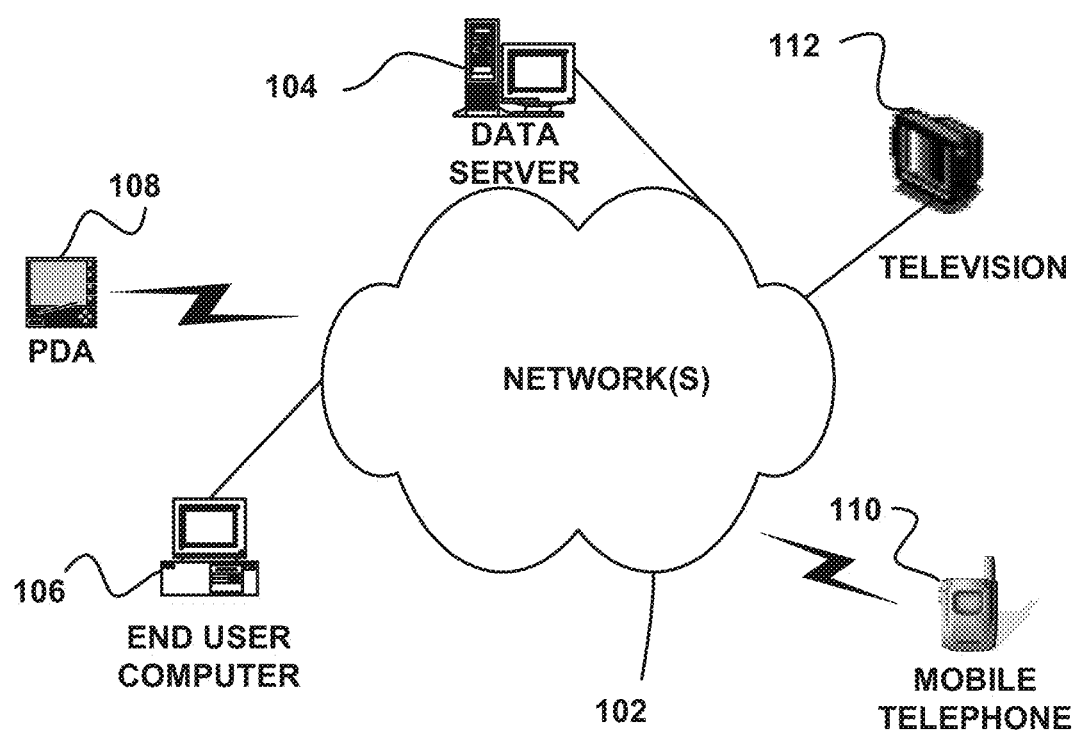
FIG. 1 illustrates a network architecture, in accordance with one possible embodiment.
Figure 1:

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
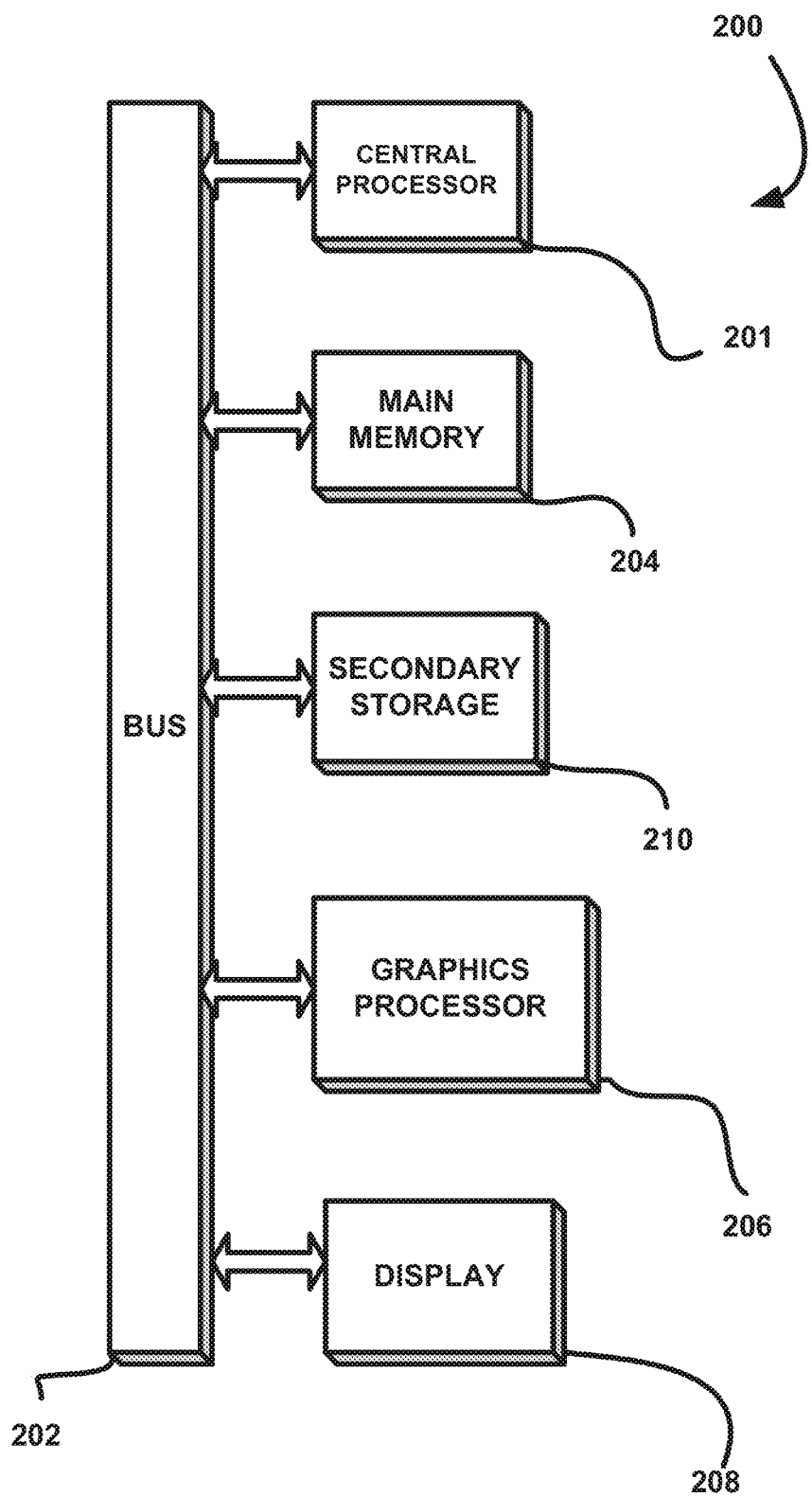
FIG. 2 illustrates an exemplary system, in accordance with one embodiment.

FIG. 2 illustrates an exemplary system 200, in accordance with one embodiment. As an option, the system 200 may be implemented in the context of any of the devices of tie network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
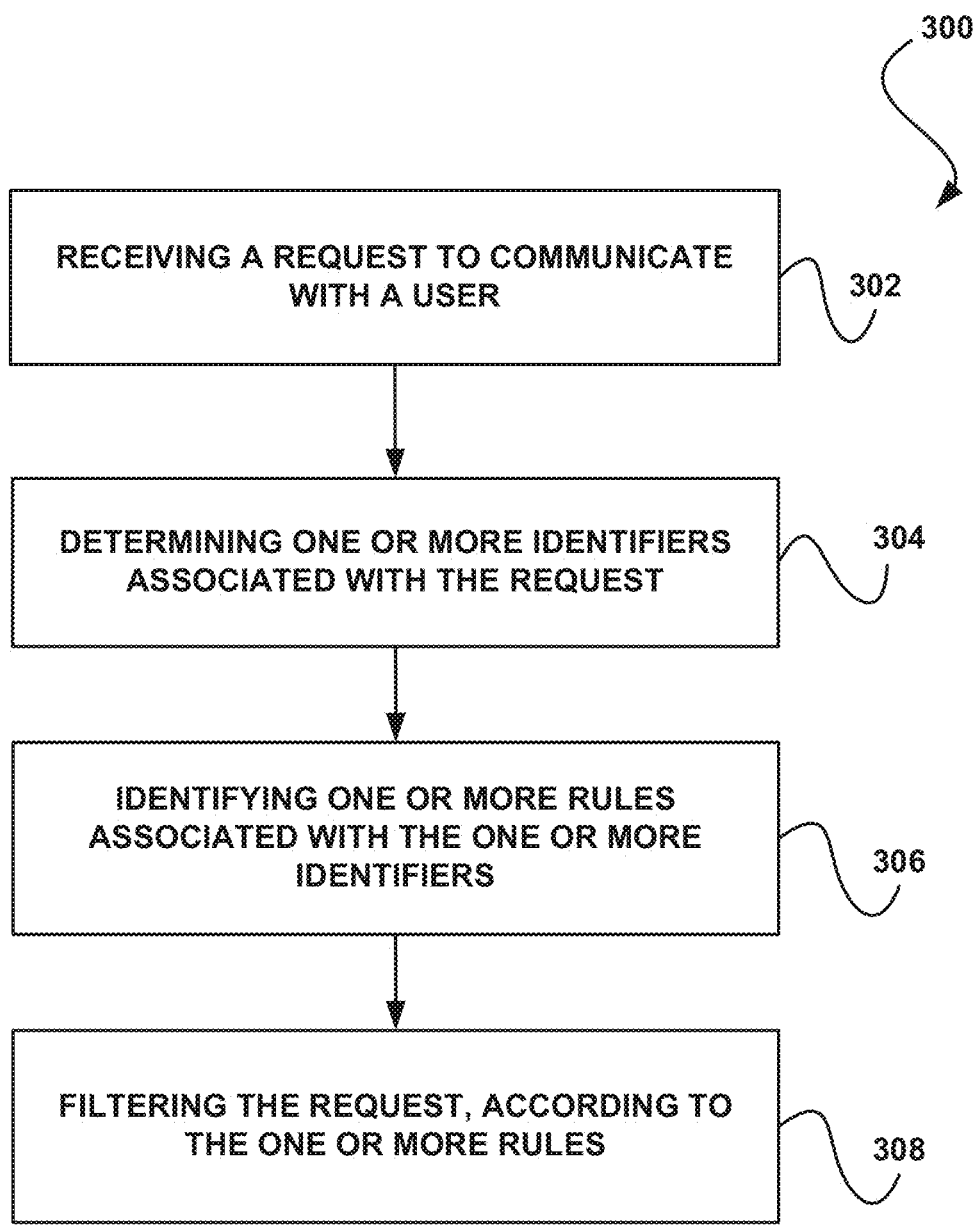
FIG. 3 illustrates a method for filtering a request to communicate with a user, in accordance with one embodiment.

FIG. 3 illustrates a method 300 for filtering a request to communicate with a user, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a request to communicate with a user is received. In one embodiment, the request may include a request to engage in a telephone call with the user. For example, the request may include an outgoing call request to the user. In another embodiment, the request may include a request to send a message to the user. For example, the request may include an outgoing message request to the user. In another embodiment, the message may include a text message, a short message service (SMS) message, a multimedia messaging service (MMS) request, etc.

Additionally, in one embodiment, the request may be received by an operator. For example, the operator may include one or more computers capable of telecommunications processing (e.g., one or more servers, etc.). In another embodiment, the user may be a customer of the operator. For example, the user may purchase one or more telecommunication services provided by the operator. In yet another embodiment, the request may be sent by another user. For example, the request may be sent by an individual, an employee of a corporation, an automated request generator (e.g., a call/text generator, etc.), etc. In still another embodiment, the other user may include a customer of the operator.

Further, in one embodiment, the request may be sent by a mobile device (e.g., a cellular communication device, a wireless (e.g., WiFi, etc.) communication device, etc. In another embodiment, the request may be sent by a non-mobile device (e.g., a home telephone connected to a wired communication service (e.g., a phone land line, etc.). In yet another embodiment, the request may be sent using voice over IP (VoIP) technology. Of course, however, the request may be sent in any manner.

Further still, in one embodiment, the request may be associated with a telephone number of the user. For example, the request may include a request to communicate with the user at the telephone number of the user (e.g., via a telecommunications device of the user, etc.). In another embodiment, the telephone number of the user may include a primary telephone number of the user (e.g., a telephone number with a directly associated telephone line, etc.). In another embodiment, the telephone number of the user may be a virtual telephone number of the user (e.g., a telephone number without a directly associated telephone line, a numbers programmed to forward incoming calls to a pre-set telephone number, etc.). In yet another embodiment, the telephone number of the user may include a virtual private number (e.g., a telephone number that forwards incoming calls to any of a number of pre-set telephone numbers, etc.).

Further still, as shown in operation 304, one or more identifiers associated with the request are determined. In one embodiment, the one or more identifiers may include an identity of the entity that sent the request. For example, the one or more identifiers may include a telecommunications number (e.g., a telephone number, a VoIP address, etc.) of the entity that sent the request, a name of the entity that sent the request, etc. In another embodiment, a plurality of telecommunications numbers may be associated with a single entity (e.g., a corporation, a company, a household, etc.), and communication requests sent from any of the plurality of telecommunications numbers may have a single identity of that entity (e.g., the name of the corporation, the name of the company, the name of the household, etc.).

Also, in one embodiment, the one or more identifiers may include one or more categories assigned to the entity that sent the request. For example, one or more categories may be associated with the identity of the entity that sent the request. In another embodiment, the one or more categories may describe one or more aspects of the entity that sent the request. For example, the one or more categories may describe one or more of a type of business the entity is engaged in, an organizational affiliation of the entity, a level of urgency associated with the entity, etc. In yet another embodiment, the one or more categories may include categories that indicate that the entity is a promotional entity, a services entity, an individual caller, an emergency services entity, an entity requesting communication from a private telecommunications number, a government agency, etc.

In addition, in one embodiment, the one or more identifiers may be assigned by the operator. For example, the one or more identifiers may be assigned by the operator when the entity that sends the request subscribes to one or more services provided by the operator. In another embodiment, the one or more identifiers may be assigned by the user. For example, the identifiers may include one or more groups created by the user (e.g., groups of individuals who participate in telecommunications with the user, etc.) based on one or more criteria. In another embodiment, the user may create the groups by accessing telecommunication numbers saved within a telecommunication device of the user, names saved within the telecommunication device of the user, etc.).

Further, as shown in operation 306, one or more rules associated with the one or more identifiers are identified. In one embodiment, the one or more rules may indicate one or more actions to perform with respect to the request to communicate with the user. For example, the one or more rules may indicate that the request to communicate with the user is to be granted (e.g., that the communication with the user may take place, etc.). In another example, the one or more rules may indicate that the request is to be redirected (e.g., redirected to a voice mailbox, to an SMS message prompt, etc.). In yet another example, the one or more rules may indicate that the request is to be blocked (e.g., the request to communicate with the user may be ignored, refused, etc.).

Further still, in one embodiment, the one or more rules may be created by the operator. For example, the one or more rules may be created by the operator as part of the operator's service policy. In another embodiment, the one or more rules may be created by the user. For example, the one or more rules may be communicated to the operator by the user (e.g., using an interface such as a graphical user interface (GUI), etc.). In yet another embodiment, the one or more rules may be linked with the one or more identifiers. For example, each of the one or more identifiers may be paired with one or more of the rules. In still another embodiment, the one or more rules may be associated with a virtual telecommunications number. For example, the one or more rules may be assigned to a virtual telephone number of the user.

Also, in one embodiment, the one or more rules may be associated with an availability of the user. For example, the one or more rules may be associated with a current availability of the user. In another embodiment, the availability of the user may include one of a plurality of statuses of the user (e.g., "busy," "not available," "available," "do not disturb," "not interested," etc.), where one or more rules are linked to each of the plurality of statuses. In yet another embodiment, the current availability of the user may change automatically (e.g., according to time, a schedule, etc.), may change manually (e.g., by the user), etc. In still another one embodiment, one or more exceptions may be associated with the one or more rules (e.g., exceptions for predetermined individuals requesting telecommunications, etc.).

Further, in one embodiment, the one or more rules may be associated with a present physical location of the user. For example, the one or more rules may be assigned by the user for use when the user is within a predetermined calling area (e.g., a telecommunications network, etc.), outside of a predetermined calling area (e.g., roaming outside of the telecommunications network, etc.), etc.

Additionally, as shown in operation 308, the request is filtered, according to the one or more rules. In one embodiment, filtering the request may include performing one or more actions indicated by the one or more rules with respect to the request to communicate with the user. For example, according to the one or more rules, the request to communicate with the user may be granted (e.g., the request may be sent to a telecommunications device of the user, such as a cellular telephone of the user, etc.), may be redirected, may be blocked, etc. In this way, communication requests may be filtered based on one or more criteria provided by one or more of the operator and the user. Additionally, such filtering may be provided by the operator, which may provide the user with greater control over their privacy while still allowing the user full utilization of telecommunication services.

Further, in one embodiment, the filtering may be selectively applied over a plurality of logical user identities supported over a single instance of physical equipment. For example, a single user telecommunications device may support a plurality of virtual telecommunications numbers, and the one or more rules used during the filtering may correspond to one of the plurality of virtual telecommunications numbers (e.g., the virtual telecommunications number used in the request to communicate with the user, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
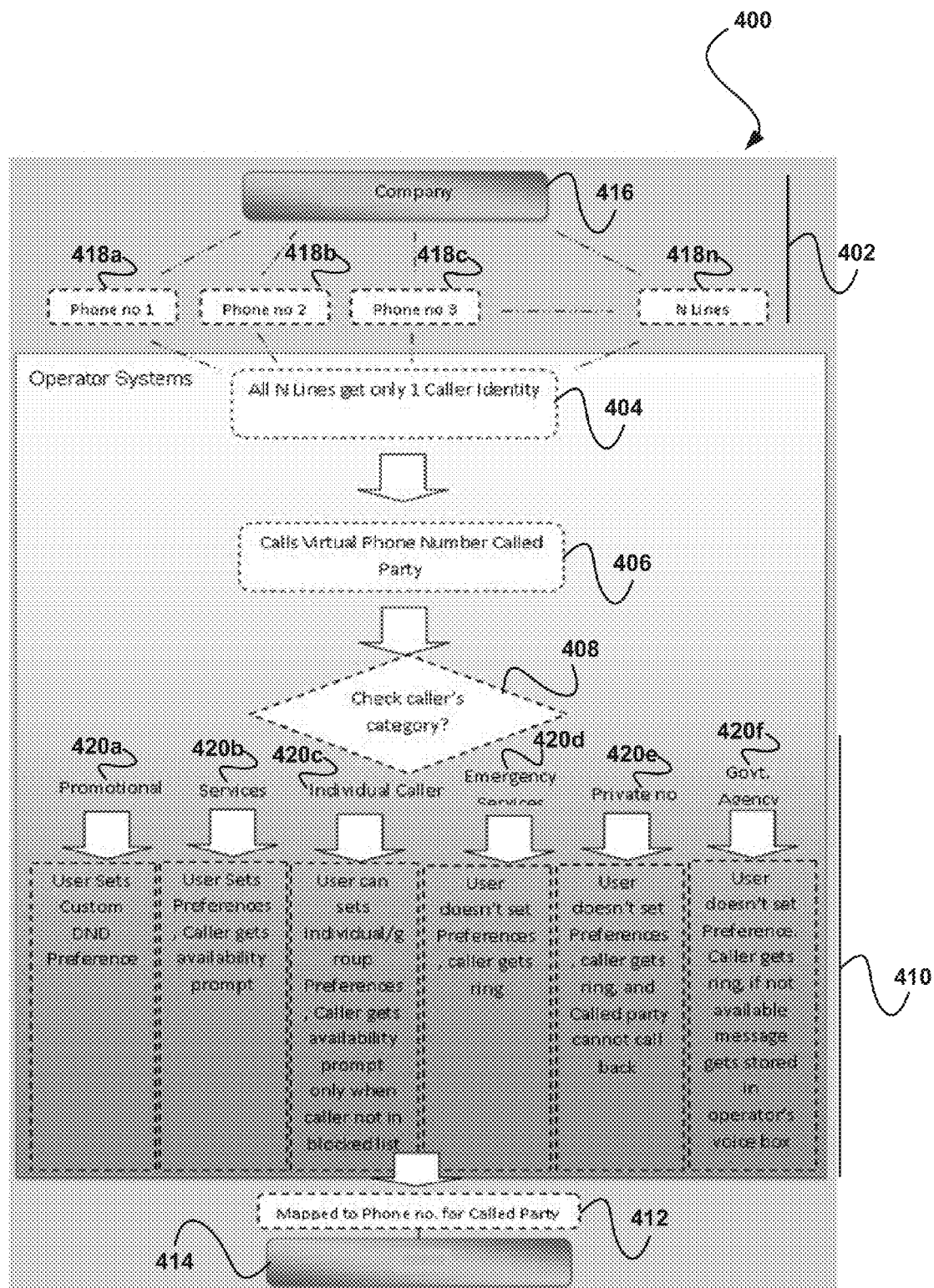
FIG. 4 illustrates a method for processing an incoming call, in accordance with one embodiment.

FIG. 4 illustrates a method 400 for processing an incoming call, in accordance with one embodiment. As an option, the method 400 may be carried out in the context of the details of FIGS. 1-3. Of course, however, the method 400 may be carried out in any desired environment. Further, the aforementioned definitions may equally apply to the description below.

As shown in operation 402, a client company 416 registers phone lines 418a-n with a telecommunications provider. Additionally, as shown in operation 404, all the phone lines 418a-n are assigned a single caller identity by a telecommunications operator. For example, all the phone lines 418a-n may be labeled with the name of the client company 416. In this way, a labeled textual caller ID may be provided to a user instead of a numerical caller ID.

Additionally, as shown in operation 406, one of the phone lines 418a-n is used by a caller to call a virtual phone number registered to a user. In one embodiment, the user may include a customer of the telecommunications provider, and the virtual phone number may be one of a plurality of virtual phone numbers assigned to the user (e.g., purchased by the user, etc.). For example, the telecommunications operator may sell the user one or more virtual phone numbers, to which the user can apply availability preferences, customized contact filters, etc. Further, as shown in operation 408, a category associated with the identity of the caller is determined, and in operation 410 one or more actions are performed, based on the determined category. In one embodiment, the category may be determined by the telecommunications operator, the user, etc.

If in operation 408 the category associated with the identity of the caller is determined to be a "promotional" category, then in operation 420a a custom do not disturb (DND) action is implemented by the telecommunications operator. In one embodiment, the custom DND action may be set by the user via a SMS channel, an unstructured supplementary service data (USSD) channel. In another embodiment, the custom DND action may include instructions provided by the user to redirect calls as per one or more preferences.

Further still, if in operation 408 the category associated with the identity of the caller is determined to be a "services" category, then in operation 420b an availability prompt is received by the caller in accordance with user preferences. In one embodiment, the availability prompt may include a ring back tone service that may allow the playing of one or more messages while the user's phone is ringing.

Also, if in operation 408 the category associated with the identity of the caller is determined to be an "individual caller" category, then in operation 420c one or more individual or group preferences established by the user are implemented, and the caller gets an availability prompt only when the caller is not on a blocked list. In one embodiment, the one or more individual or group preferences may include one or more levels of availability set by the user. Table 1 illustrates examples of possible availability parameters that may be set by the user, in accordance with one embodiment. Of course, it should be noted that the availability parameters shown in Table 1 is set forth for illustrative purposes only, and thus should not be construed as limiting in any manner.

TABLE 1

1. User set preferences: user may be able to set levels of availability as follows:
   a. Available - Available to take call
   b. Busy - I am busy, however I can take calls if you really feel necessary to call me. A ring back tone like service may first prompt you that I am busy, if still you keep the line on, I may get a ring.
   c. Do not disturb - I am really busy and I will mind if you call me TABLE 1-continued however if heaven is falling then if you call me, you may get an excuse response and an SMS may be delivered to me indicating your textual caller id/phone number, just like a missed call alert service.
   d. Not available - I am just not available to take calls, you cannot ring me however you can send me text messages, voice SMS, and record your message in a voice recorder.
   e. Not interested in you - I am not interested to take calls, you cannot ring me, cannot SMS me and you cannot fill my voice recorder capacity with your messages.

In another embodiment, the user may be able to create groups of contacts and may set availability over the groups (e.g., using one or more user set preferences, etc.). In yet another embodiment, the user may also set availability at both a group level as well as an individual level. In still another embodiment, individual level preferences may take precedence over group level preferences. Also, in one embodiment, the user may be able to populate the groups of contacts by choosing contacts from phone numbers available within a predetermined list (e.g., a phone contact list of phone numbers saved to the user's phone, etc.).

In addition, in one embodiment, the user may set availability for all callers not in a predetermined list by setting an availability status for in circle/out of circle callers and by setting an availability status when the user is in a predetermined circle, national roaming area, international roaming area, etc. In another embodiment, the user may create a DND exception list where a specific promotional caller may reach the user directly.

Further, if in operation 408 the category associated with the identity of the caller is determined to be an "emergency services" category, then in operation 420d the user is called directly on their mobile device. In one embodiment, the "emergency services" category may include phone lines associated with pharmacies, hospitals, doctors, police, etc. In another embodiment, the telecommunications operator may redirect calls from the "emergency services" category directly to the user regardless of the user's settings with respect to this category. In yet another embodiment, one or more availability parameters may apply to the "emergency services" category, where such availability parameters may be set by the user.

Further still, if in operation 408 the category associated with the identity of the caller is determined to be a "private number" category, then in operation 420e the user is called directly on their mobile device, and the user cannot call the caller using the caller's number. Also, if in operation 408 the category associated with the identity of the caller is determined to be a "government agency" category, then in operation 420f the caller is called directly on their mobile device, and message availability is provided to the caller. For example, the user's availability parameters may apply to the call, but it may be mandatory to provide this category with an option to record a message.

Additionally, as shown in operation 412, the call directed to the virtual phone number is mapped to the phone number of the user, in accordance with the actions performed in operation 410. Further, as shown in operation 414, the phone call is completed, in accordance with the actions performed in operation 410. In this way, a user may set custom call preferences for specific categories of callers, where such callers may be categorized by the operator, by the user, etc. Further, user availability may be set based on movements into and out of predetermined calling circles, and not merely the user's last use of their telecommunications device.

Also, in one embodiment, the telecommunications operator may set one or more categories with its own spam rules and filters which the operator may maintain in a manner similar to email service providers. In another embodiment, user set custom filters may apply when a call is permitted to follow user preferences. For example, an emergency call may not be filtered by a virtual number, etc.

Further still, the user may keep an existing phone number and add virtual phone numbers to each of which the user can assign unique preferences (e.g., preferences dictating when incoming calls are to be diverted to voice mail servers, SMS, generation of excuse messages via services such as caller ring back tone services, generation of custom/operator themes for caller identification, etc.). Also, spam filtering rules determined by the user and applied to one or more virtual phone numbers may therefore be applied to categories of callers determined by the telecommunications operator.

Figure 5:
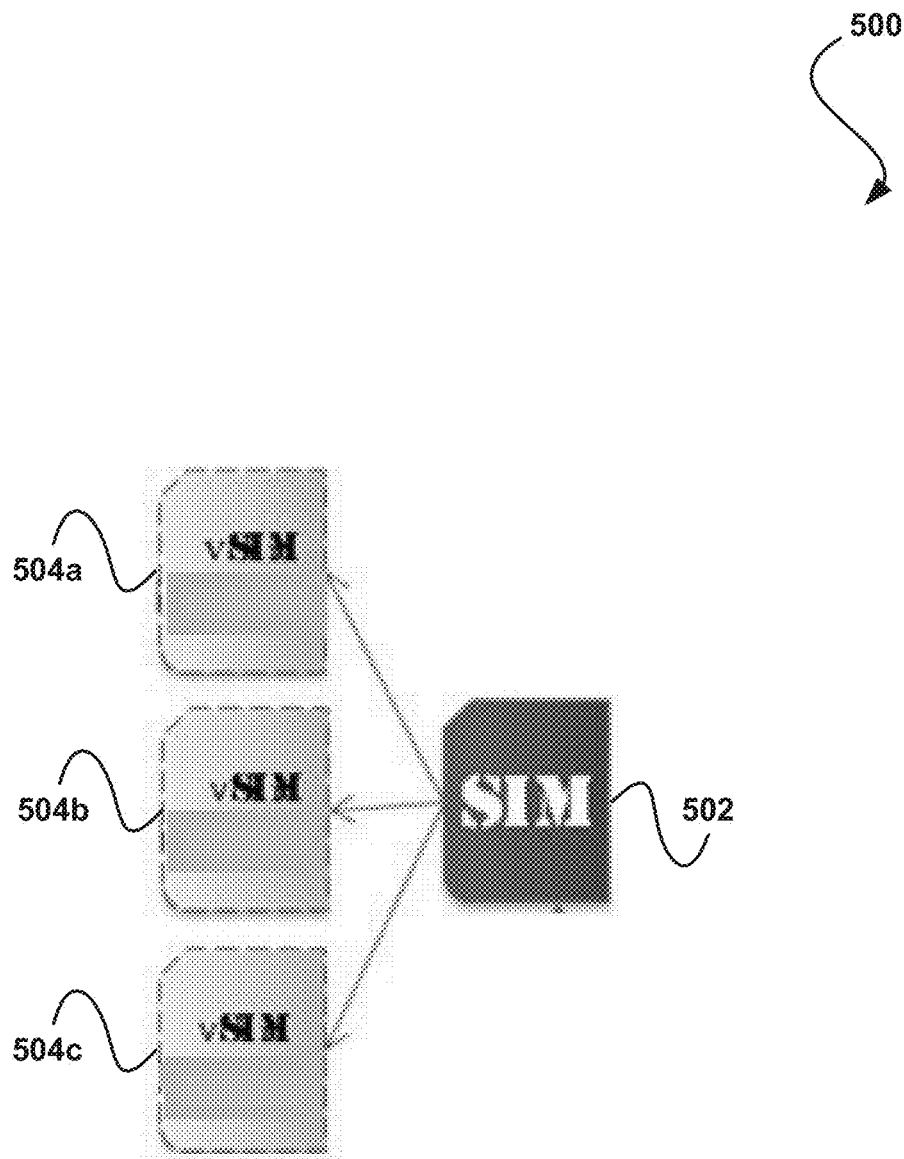
FIG. 5 illustrates a virtual number assignment system, in accordance with one embodiment.

FIG. 5 illustrates a virtual number assignment system 500, in accordance with one embodiment. As an option, the system 500 may be carried out in the context of the details of FIGS. 1-4. Of course, however, the system 500 may be carried out in any desired environment. Further, the aforementioned definitions may equally apply to the description below.

As shown, a physical subscriber identity module (SIM) card 502 is associated with three virtual SIM cards 504a-c. In one embodiment, the three virtual SIM cards 504a-c may be implemented by a telecommunications operator. For example, the three virtual SIM cards 504a-c may be sold to a user by the telecommunications operator. In another embodiment, each of the three virtual SIM cards 504a-c may be assigned an individual telecommunications number (e.g., phone number, etc.). In still another embodiment, the physical SIM card 502 may be installed within a telecommunications device (e.g., a cellular telephone, mobile computing device, etc.).

Additionally, in one embodiment, a user may assign one or more parameters to each of the three virtual SIM cards 504a-c. For example, the user may assign a name or purpose to each of the three virtual SIM cards 504a-c, as well as one or more rules associated with access to the user via the three virtual SIM cards 504a-c. In one embodiment, the user may assign the first virtual SIM card 504a as a personal number for the user, and may note that all numbers not explicitly listed by the user as "friends" within the telecommunications operator are to be barred from connecting with the user via the first virtual SIM card 504a. In another embodiment, the user may enable an exception to incoming calls regarding holiday promotions, such that incoming calls from numbers not explicitly listed by the user as "friends" may still be connected to the user via the first virtual SIM card 504a if such incoming calls originate from an entity determined by the telecommunications operator to be affiliated with a holiday promotion.

In yet another embodiment, the user may assign the second virtual SIM card 504b as an office number for the user, and may note that all numbers identified by the telecommunications operator as "unsolicited callers" are to be barred from connecting with the user via the second virtual SIM card 504b. Further, in one embodiment, the user may note that all numbers identified by the telecommunications operator as "job site calls" are to be unbarred from connecting with the user via the second virtual SIM card 504b.

Further still, in one embodiment, the user may assign the third virtual SIM card 504c as an international number for the user, and may note that all numbers identified by the telecommunications operator as "unsolicited callers" and "promotional callers" are to be barred from connecting with the user via the third virtual SIM card 504b. In another embodiment, the user may tag one or more custom textual themes as a caller identity for each of the three virtual SIM cards 504a-c when the user makes calls using the physical SIM card 502. In yet another embodiment, a textual basic theme generated by the telecommunications operator may be tagged by the user with an identity of the user.

In this way, the user may specify call connection rules for each of the three virtual SIM cards 504a-c of the user's physical SIM card 502. Additionally, the user may customize their availability to take a call for a given individual, a given group, a given category of caller, etc. Further, customized DND on demand may be applied to incoming calls to the user's physical SIM card 502.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
computer code for receiving, from an entity at an operator, a request to communicate with a user at a virtual phone number of the user, wherein the virtual phone number is one of a plurality of virtual phone numbers assigned to the user;
computer code for determining, by the operator, one or more identifiers associated with there entity;
computer code for identifying, by the operator, one or more rules that are:
assigned to the virtual phone number of the user at which the communication is requested, and
associated with the one or more identifiers associated with the entity; and
computer code for filtering, by the operator, the request using a first filtering action, according to the one or more rules;
wherein the first filtering action is associated with the virtual phone number of the user at which the communication is requested, and a second filtering action different than the first filtering action is associated with another one of the virtual phone numbers assigned to the user.

2. The computer program of claim 1, wherein the request includes a request to engage in a telephone call with the user.

3. The computer program of claim 1, wherein the one or more identifiers include an identity of the entity that sent the request.

4. The computer program of claim 3, wherein the computer program is operable such that a plurality of telecommunications numbers are associated with a single entity, and communication requests sent from any of the plurality of telecommunications numbers have a single identity of that entity.

5. The computer program of claim 1, wherein the one or more identifiers include one or more categories assigned to the entity that sent the request.

6. The computer program of claim 5, wherein the one or more categories describe one or more of a type of business the entity is engaged in, an organizational affiliation of the entity, and a level of urgency associated with the entity.

7. The computer program of claim 5, wherein the one or more categories include categories that indicate that the entity is a promotional entity, a services entity, an individual caller, an emergency services entity, an entity requesting communication from a private telecommunications number, or a government agency.

8. The computer program of claim 1, wherein the one or more identifiers are assigned by the operator.

9. The computer program of claim 8, wherein the one or more identifiers are previously assigned to the entity by the operator when the entity that sends the request subscribes to one or more services provided by the operator.

10. The computer program of claim 1, wherein the one or more identifiers are assigned by the user.

11. The computer program of claim 1, wherein the one or more identifiers include one or more groups created by the user.

12. The computer program of claim 1, wherein the one or more rules are associated with a present physical location of the user.

13. The computer program of claim 1, wherein the one or more rules are associated with an availability of the user.

14. The computer program of claim 1, wherein filtering the request using the first filtering action includes redirecting the request to a Short Message Service (SMS) message prompt.

15. A method, comprising:
   receiving, from an entity at an operator, a request to communicate with a user at a virtual phone number of the user, wherein the virtual phone number is one of a plurality of virtual phone numbers assigned to the user;
   determining by the operator, utilizing a processor, one or more identifiers associated with the entity;
   identifying, by the operator, one or more rules that are:
      assigned to the virtual phone number of the user at which the communication is requested, and
      associated with the one or more identifiers associated with the entity; and
   filtering, by the operator, the request using a first filtering action, according to the one or more rules;
   wherein the first filtering action is associated with the virtual phone number of the user at which the communication is requested, and a second filtering action different than the first filtering action is associated with another one of the virtual phone numbers assigned to the user.

16. A system, comprising:
a processor for:
   receiving, from an entity at an operator, a request to communicate with a user at a virtual phone number of the user, wherein the virtual phone number is one of a plurality of virtual phone numbers assigned to the user;
   determining, by the operator, one or more identifiers associated with the entity;
   identifying, by the operator, one or more rules that are:
      assigned to the virtual phone number of the user at which the communication is requested, and
      associated with the one or more identifiers associated with the entity; and
   filtering, by the operator, the request using a first filtering action, according to the one or more rules;
   wherein the first filtering action is associated with the virtual phone number of the user at which the communication is requested, and a second filtering action different than the first filtering action is associated with another one of the virtual phone numbers assigned to the user.

17. The system of claim 16, wherein the processor is coupled to memory via a bus.

* * * * *

UNITED STATES PATENT AND TRADEMARK OFFICE
CERTIFICATE OF CORRECTION

PATENT NO. : 8,750,842 B1
APPLICATION NO. : 13/410235
DATED : June 10, 2014
INVENTOR(S) : Anunay Kumar Prasad Page 1 of 1

It is certified that error appears in the above-identified patent and that said Letters Patent is hereby corrected as shown below:

In the Claims:
At column 8, claim number 1, line number 30; please replace "there" with --the--.

Signed and Sealed this
Twelfth Day of April, 2016

Michelle K. Lee
*Director of the United States Patent and Trademark Office*